(12) United States Patent
Lin et al.

(10) Patent No.: US 12,092,882 B2
(45) Date of Patent: Sep. 17, 2024

(54) OPTICAL ELECTRICAL CONNECTOR WITH IMPROVED HEAT DISSIPATION PERFORMANCE

(71) Applicant: DONGGUAN LUXSHARE TECHNOLOGIES CO., LTD, Dongguan (CN)

(72) Inventors: Yi-Tseng Lin, Dongguan (CN); Chih-Wei Yu, Dongguan (CN); Chien-Tzu Wu, Dongguan (CN); Kuen-Da Jeng, Dongguan (CN); Min-Sheng Kao, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 219 days.

(21) Appl. No.: 17/858,368

(22) Filed: Jul. 6, 2022

(65) Prior Publication Data
US 2023/0161121 A1    May 25, 2023

(30) Foreign Application Priority Data
Nov. 19, 2021   (CN) .......................... 202122854160.0

(51) Int. Cl.
  *G02B 6/42* (2006.01)
(52) U.S. Cl.
  CPC ......... *G02B 6/4269* (2013.01); *G02B 6/4256* (2013.01); *G02B 6/428* (2013.01); *G02B 6/4284* (2013.01); *G02B 6/4246* (2013.01)

(58) Field of Classification Search
  CPC .. G02B 6/4246; G02B 6/4269; G02B 6/4278; G02B 6/428; G02B 6/4281
  See application file for complete search history.

(56) References Cited

U.S. PATENT DOCUMENTS 9,641,254 B1 *   5/2017  Shen .................... G02B 6/4269
10,495,832 B2   12/2019  Sun et al.
(Continued)

FOREIGN PATENT DOCUMENTS

CN     104934386 B    11/2017
CN     109283631 A *  1/2019
(Continued)

*Primary Examiner* — Michael Stahl
(74) *Attorney, Agent, or Firm* — Birch, Stewart, Kolasch & Birch, LLP

(57) ABSTRACT

An optical electrical connector includes a casing, a printed circuit board, an electronic chip, a photoelectric conversion component, and a heat sink device. The casing includes an electrical port and an optical port. A receiving space is defined between the electrical port and the optical port. The printed circuit board extends longitudinally along a first direction. The printed circuit board includes a main body portion located in the receiving space and a front end portion exposed in the electrical port. The electronic chip, the photoelectric conversion component and the heat sink device are all accommodated in the receiving space. The electronic chip and the photoelectric conversion component are not only disposed on the printed circuit board, but also electrically connected to the printed circuit board. The heat sink device is disposed on the casing and faces the electronic chip for conducting the heat accumulated on the electronic chip.

18 Claims, 11 Drawing Sheets

(56) References Cited

U.S. PATENT DOCUMENTS

| | | | | |
|---|---|---|---|---|
| 2004/0105633 A1* | 6/2004 | Ishikawa | ............ | G02B 6/4277 385/92 |
| 2005/0095901 A1* | 5/2005 | Miller | ................ | G02B 6/4272 439/485 |
| 2006/0285806 A1* | 12/2006 | Ahrens | ............ | G02B 6/4284 385/92 |
| 2009/0190310 A1* | 7/2009 | Hosking | ............ | G02B 6/4292 361/699 |
| 2014/0193160 A1* | 7/2014 | Yagisawa | ............ | G02B 6/4284 398/136 |
| 2015/0078408 A1* | 3/2015 | Bukkems | ............ | G02B 6/4257 372/20 |
| 2015/0185427 A1* | 7/2015 | Arao | .................. | G02B 6/4269 29/829 |
| 2015/0331208 A1* | 11/2015 | Moriyama | .......... | G02B 6/4295 385/14 |
| 2018/0217343 A1* | 8/2018 | Matsumura | ............ | G02B 6/428 |
| 2018/0231726 A1* | 8/2018 | Mizuno | ................ | G02B 6/4246 |
| 2019/0044299 A1* | 2/2019 | Kazav | .................... | H01R 27/00 |
| 2019/0097735 A1* | 3/2019 | Akieda | ................ | G02B 6/4266 |
| 2019/0190605 A1* | 6/2019 | Zhang | ....................... | G06F 1/20 |
| 2020/0326494 A1* | 10/2020 | Ishii | ...................... | G02B 6/4269 |
| 2021/0239922 A1* | 8/2021 | Du | ........................ | H04B 10/503 |
| 2022/0075133 A1* | 3/2022 | Lin | ...................... | G02B 6/4272 |
| 2022/0413238 A1* | 12/2022 | Chen | .................... | G02B 6/4269 |
| 2023/0333335 A1* | 10/2023 | Sun | ...................... | G02B 6/4279 |

FOREIGN PATENT DOCUMENTS

| | | |
|---|---|---|
| CN | 110865440 A | 3/2020 |
| CN | 110865441 A | 3/2020 |
| CN | 110891396 A | 3/2020 |
| CN | 110730599 B | 7/2021 |
| JP | 4719093 B2 * | 4/2011 |
| WO | WO 2021/212849 A1 * | 10/2021 |

* cited by examiner

OPTICAL ELECTRICAL CONNECTOR WITH IMPROVED HEAT DISSIPATION PERFORMANCE

CROSS-REFERENCE TO RELATED APPLICATION

This patent application claims a priority of a Chinese Patent Application No. 202122854160.0, filed on Nov. 19, 2021 and titled "OPTICAL ELECTRICAL CONNECTOR", the entire content of which is incorporated herein by reference.

TECHNICAL FIELD

The present disclosure relates to an optical electrical connector, belonging to the technical field of electronic equipment field.

BACKGROUND

In the field of optical electrical connectors, with the rapid development of communication technology, the market demand for high-speed optical modules is increasing day by day. In response to the market's demand for high-bandwidth and high-speed data transmission, the optical module design of optical electrical connectors is developing in the direction of miniaturization and high density. With the development of high-speed and high-bandwidth module technology, the high thermal power consumption of miniaturized high-density optical modules also become a problem that must be faced. If a good heat dissipation effect cannot be guaranteed, the performance of temperature-sensitive photoelectric conversion components and electronic chips in the optical module will be greatly reduced, and even the entire optical module will not work normally or fail. Therefore, a more efficient and stable heat dissipation structure needs to be adopted to ensure stable operation of the electronic device.

SUMMARY

An object of the present disclosure is to provide an optical electrical connector, which have a more efficient and stable heat dissipation structure.

In order to achieve the above object, the present disclosure discloses an optical electrical connector comprising a casing, a printed circuit board, at least one electronic chip, at least one photoelectric conversion component, and a heat sink device. The casing comprises an electrical port and an optical port. The electrical port has a plurality of gold fingers disposed thereon. The optical port is disposed opposite to the electrical port along a first direction. A receiving space is defined by the casing between the electrical port and the optical port. The printed circuit board extends longitudinally along the first direction. The printed circuit board comprises a main body portion located in the receiving space and a front end portion exposed in the electrical port. The electronic chip and The photoelectric conversion component are accommodated in the receiving space. The electronic chip and the photoelectric conversion component are not only disposed on the printed circuit board but also electrically connected to the printed circuit board. The heat sink device is accommodated in the receiving space and disposed on the casing. The heat sink device faces the electronic chip for conducting the heat accumulated on the electronic chip to the outside of the optical electrical connector through the casing.

In order to achieve the above object, the present disclosure further discloses an optical electrical connector a printed circuit board, a heat sink device, an electronic chip, a photoelectric conversion component and a casing. The printed circuit board extends longitudinally which is defined as a first direction. The casing comprises a receiving space accommodating all of the heat sink device, the electronic chip and the photoelectric conversion component. Both the electronic chip and the photoelectric conversion component are not only disposed on the printed circuit board but also electrically connected to the printed circuit board. The heat sink device is disposed on the casing and faces the electronic chip in a second direction perpendicular to the first direction. The heat sink device absorbs the heat accumulated on the electronic chip and disperses the heat to the outside of the optical electrical connector via the casing.

Compared with the prior art, because the heat sink device is disposed on the casing and faces the electronic chip, the heat sink device absorbs the heat accumulated on the electronic chip and disperses the heat to the outside of the optical electrical connector. The present disclosure has more efficiently dissipation of heat into air.

DETAILED DESCRIPTION

Figure 1:
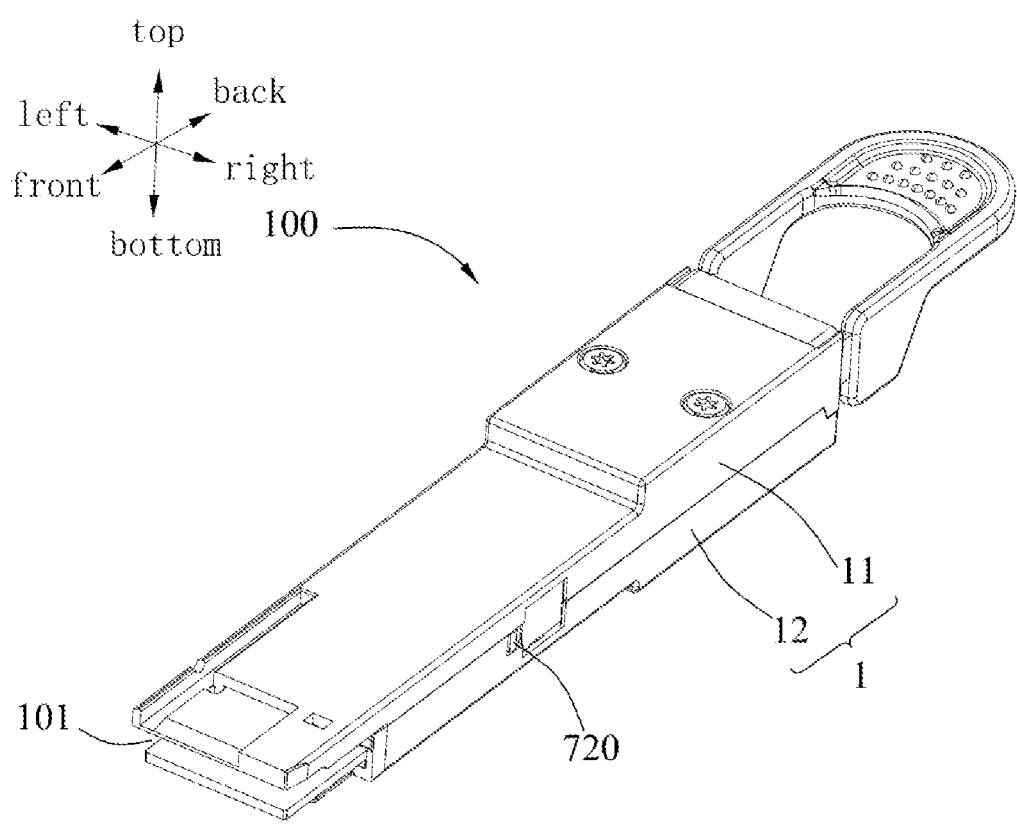
FIG. 1 is a first perspective, assembled view of an optical electrical connector in accordance with an embodiment of the present disclosure.

At least one exemplary embodiment will be described in detail here, examples of which are shown in drawings. When referring to the drawings below, unless otherwise indicated, same numerals in different drawings represent the same or similar elements. The examples described in the following exemplary embodiment do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "bottom" and/or "top" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Referring to FIGS. 1 to 11, the present disclosure discloses an optical electrical connector 100 includes a casing 1, a heat sink device 2, a printed circuit board 3, at least one electronic chip 4 and at least one photoelectric conversion component 5.

The printed circuit board 3 extends longitudinally which is defined as a first direction (i.e., a front-rear direction) in FIG. 1. The casing 1 has an electrical port 101 and an optical port 102 oppositely disposed along the first direction. The casing 1 forms a receiving space (not numbered) between the electrical port 101 and the optical port 102. The heat sink device 2, the electronic chip 4 and the photoelectric conversion component 5 are all accommodated in the receiving space.

The printed circuit board 3 includes a main body portion 31 located in the receiving space and a front end portion 32 exposed in the electrical port 101. A plurality of gold fingers are disposed on the electrical port 101. The electronic chip 4 and the photoelectric conversion component 5 are not only disposed on the printed circuit board 3 but also electrically connected to the printed circuit board 3. The heat sink device 2 is disposed on the casing 1 and faces the electronic chip 4. The heat sink device 2 conducts the heat accumulated on the electronic chip 4 to the outside of the optical electrical connector 100 through the casing 1.

The heat sink device 2 is made of metal material, and the heat sink device 2 made of metal material has good thermal conductivity. In a preferred embodiment, the heat sink device 2 is made of alloy in order to achieve better heat conduction.

Figure 7:
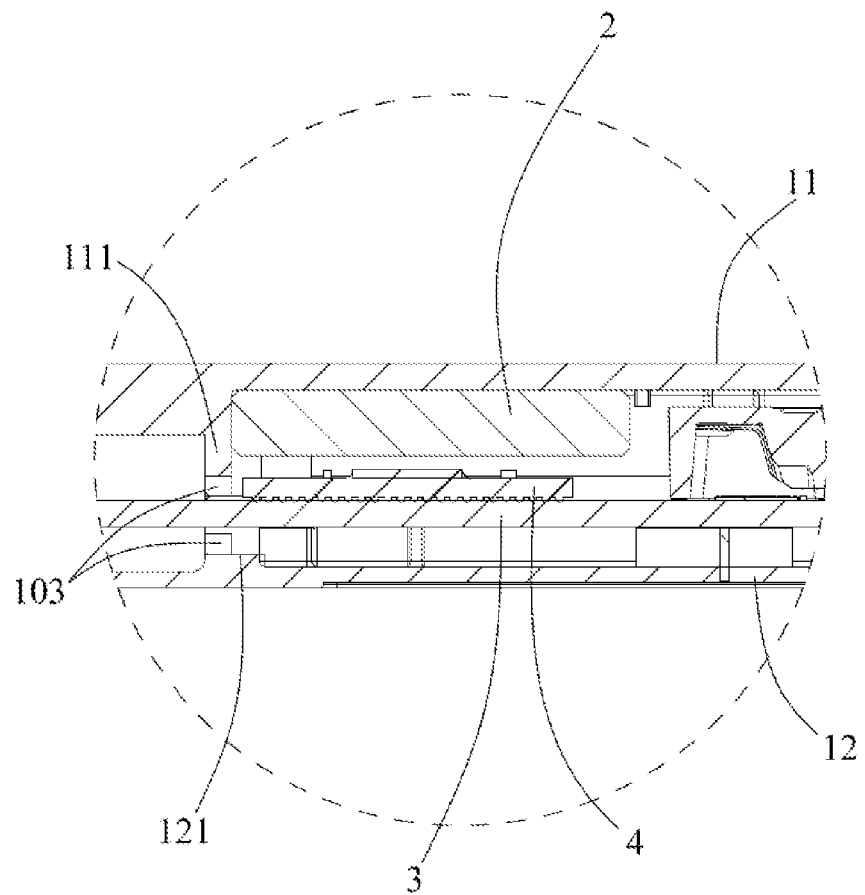
FIG. 7 is a perspective, further exploded view of a portion C in FIG. 6 when the portion C has been rotated for 90 degrees along a clockwise direction.
Figure 8:
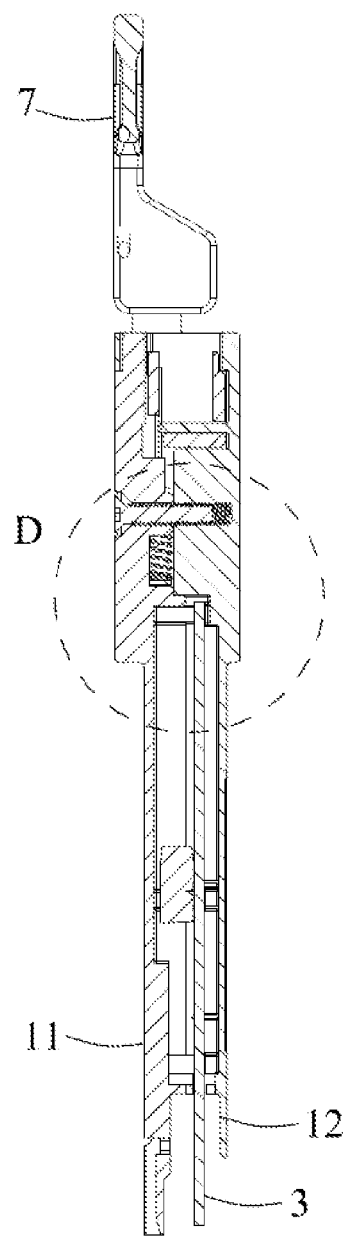
FIG. 8 is a schematic cross-sectional view of the optical electrical connector when taken along line B-B in FIG. 5.
Figure 9:
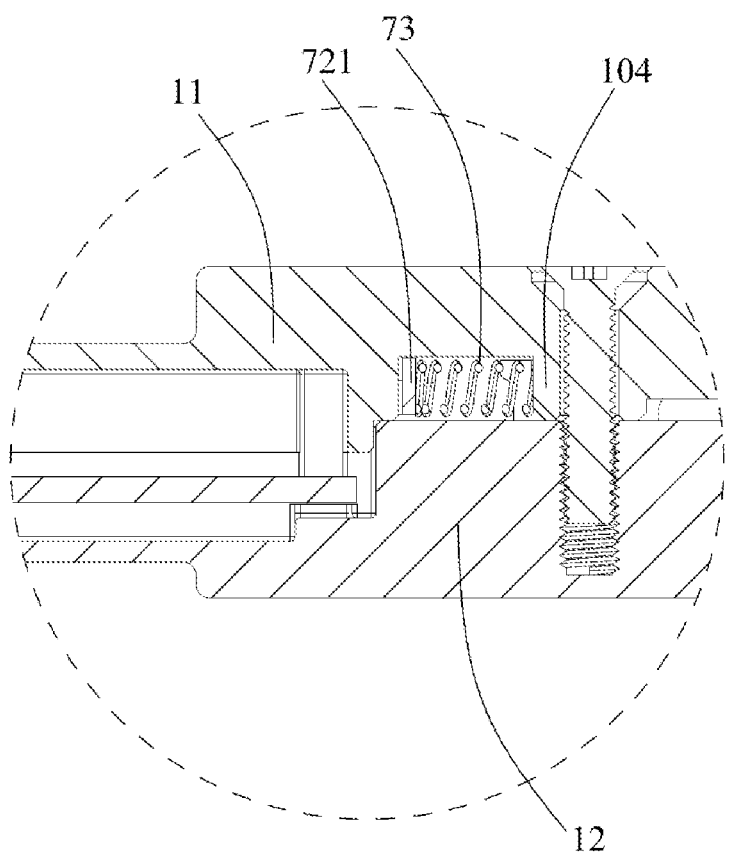
FIG. 9 is a perspective, further exploded view of a portion D in FIG. 6 when the portion D has been rotated for 90 degrees along a clockwise direction.
Figure 10:
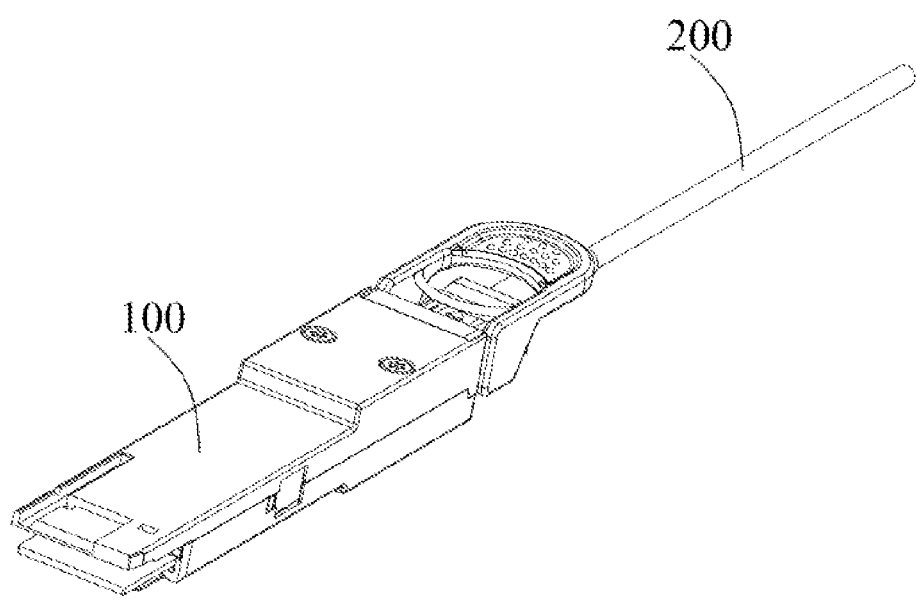
FIG. 10 is a perspective, assembled view of the optical electrical connector and a cable assembly of the present disclosure.
Figure 11:
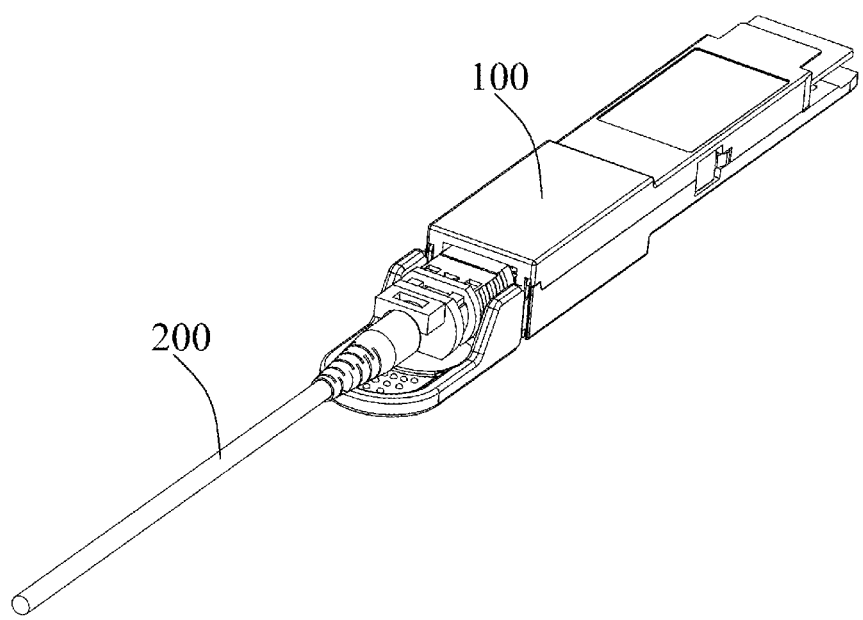
FIG. 11 is another perspective, assembled view of the optical electrical connector and the cable assembly of the present disclosure.

Referring to FIG. 7, in a first embodiment of the present disclosure, the casing 1 is a metal casing 1. The metal heat sink device 2 and the metal casing 1 are fixed together by welding. In a second embodiment of the present disclosure, the casing 1 is an injection-molded plastic casing 1. The metal heat sink device 2 is integrated with the plastic casing 1 by insert molding. In conclusion, the heat sink device 2 of the present disclosure is disposed on the casing 1.

Figure 2:
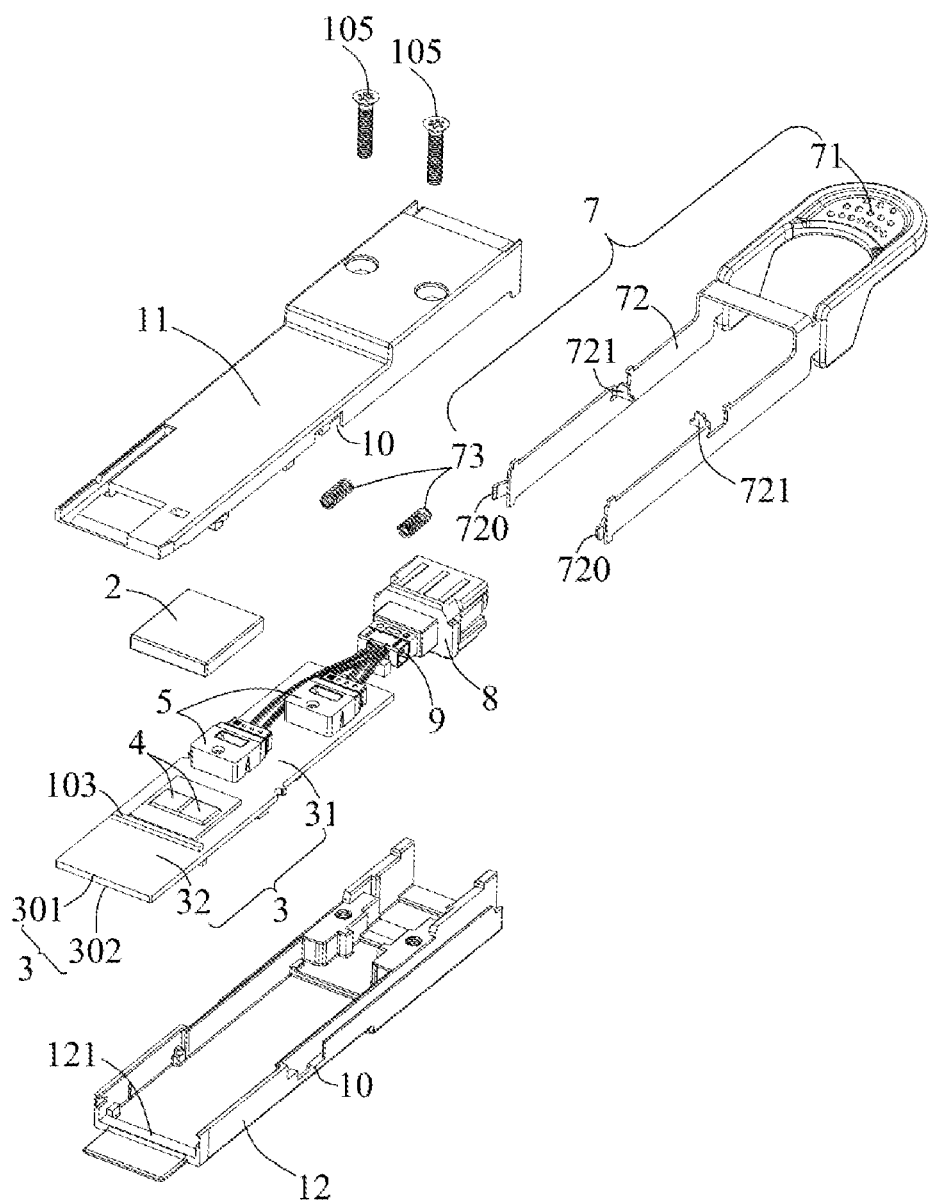
FIG. 2 is a first perspective, exploded view of the optical electrical connector.
Figure 3:
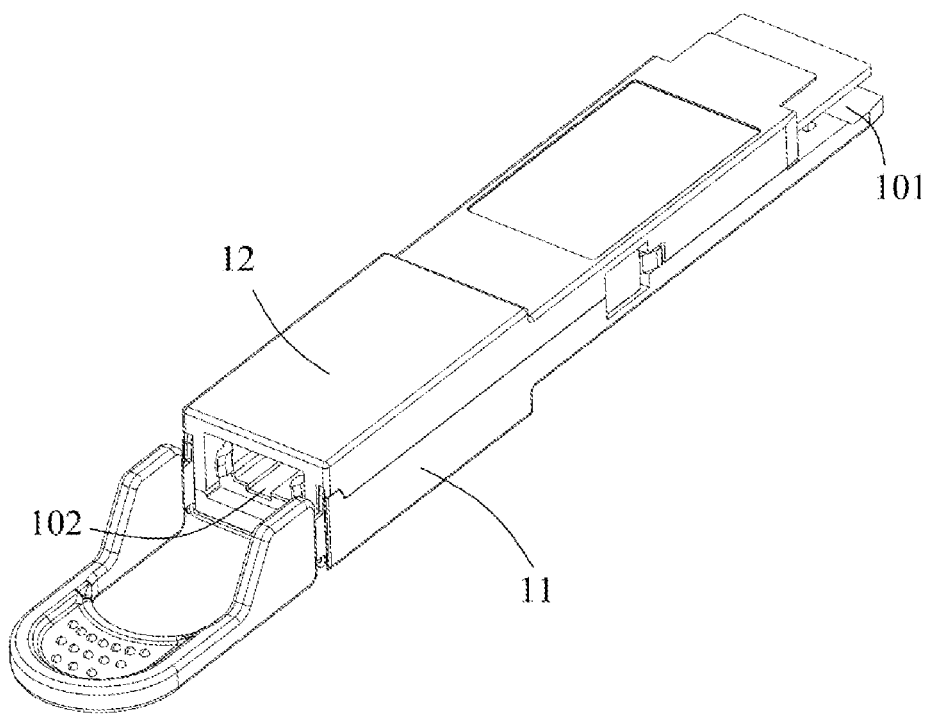
FIG. 3 is a second perspective, assembled view of the optical electrical connector.
Figure 4:
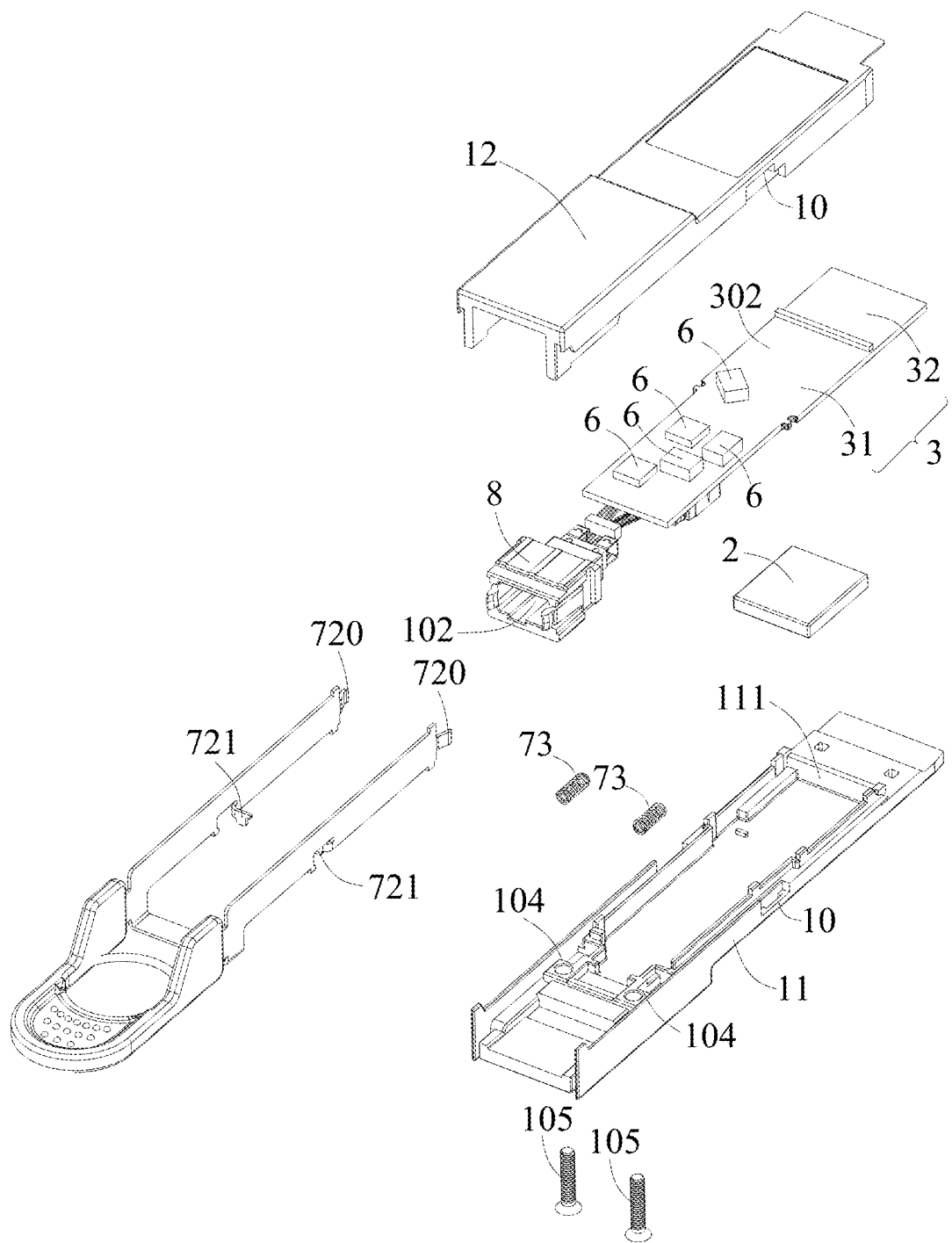
FIG. 4 is a second perspective, exploded view of the optical electrical connector.
Figure 5:
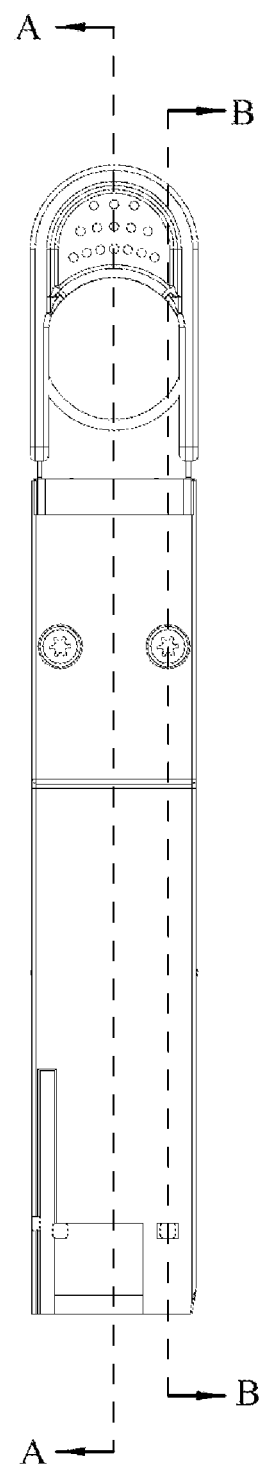
FIG. 5 is a top view of the a top view of the optical electrical connector of FIG. 1.
Figure 6:
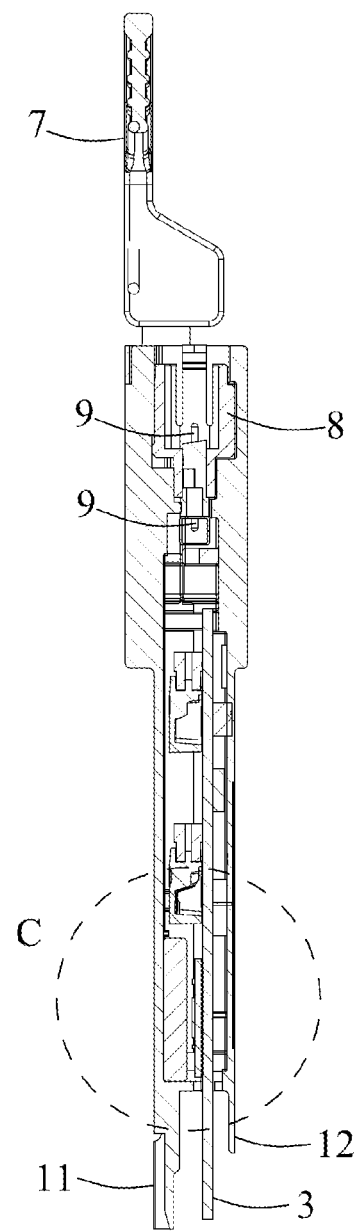
FIG. 6 is a schematic cross-sectional view of the optical electrical connector when taken along line A-A in FIG. 5.

Referring to FIGS. 2, 4 and 7, the optical electrical connector 100 of the present disclosure further includes an electromagnetic wave absorbing element 103. The casing 1 includes a first casing 11 and a second casing 12 which are separately formed. The first casing 11 and the second casing 12 are fastened together in a second direction (i.e., the vertical direction in FIG. 1) perpendicular to the first direction to form the receiving space. The first casing 11 and the second casing 12 are fixed by screws 105 after being fastened together. The first casing 11 includes a first extension portion 111 protruding toward the second casing 12. The second casing 12 includes a second extension portion 121 protruding toward the first casing 11. The first extension portion 111 and the second extension portion 121 are aligned in the second direction. The electromagnetic wave absorbing element 103 is not only disposed between the first extension portion 111 and the printed circuit board 3 but also between the second extension portion 121 and the printed circuit board 3. The gold fingers are located on the first side of the electromagnetic wave absorbing element 103 in the first direction. The heat sink device 2, the electronic chip 4 and the photoelectric conversion component 5 are all located on the second side of the electromagnetic wave absorbing element 103 in the first direction. It is known that, the first side and the second side are opposite sides of the electromagnetic wave absorbing element 103 in the first direction. The role of the electromagnetic wave absorbing element 103 is to fill the gap existing between the first casing 11 and the second casing 12 when they are fastened together, so as to prevent electromagnetic interference.

The printed circuit board 3 includes a first surface 301 facing the first casing 11 and a second surface 302 facing the second casing 12. The heat sink device 2 is disposed on the first casing 11 and faces the electronic chip 4 disposed on the first surface 301 of the printed circuit board 3.

Referring to FIGS. 2 and 4, the optical electrical connector 100 of the present disclosure includes thermal conductive material (not shown). The thermal conductive material is filled between the heat sink device 2 and the electronic chip 4. The electronic chip 4 is mounted on the first surface 301 of the main body portion 31. The thermal conductive material may be thermal conductive colloid. The function of the thermal conductive material is to make the heat generated by the electronic chip 4 transfer to the casing 1 through the heat sink device 2 more quickly and then dissipate into the air.

Referring to FIGS. 2, 4, 6, and 7, the optical electrical connector 100 of the present disclosure includes a plurality of thermal conductive pads 6. The thermal conductive pads 6 are sandwiched between the printed circuit board 3 and the second casing 12. The thermal conductive pad 6 is mounted on the second surface 302 of the main body portion 31. The function of the thermal conductive pad 6 is to fill the gap between the printed circuit board 3 and the second casing 12. In this way, heat conduction becomes solid conduction, which can be quickly exported.

Referring to FIGS. 1 to 4, the optical electrical connector 100 of the present disclosure can be engaged with a mating connector (not shown) to form an electrical connection at the end of the electrical port 101. Therefore, the present disclosure includes a lock structure 7. The lock structure 7 includes a pull ring 71 exposed outside of the casing 1 and a pull strap 72 connected with the pull ring 71. The pull strap 72 includes a snapping portion 720 at the end away from the pull ring 71. The casing 1 includes an opening 10. The snapping portion 720 is located in the opening 10 and the snapping portion 720 is restricted by the opening 10. The snapping portion 720 can be disengaged from the opening 10 under the pulling force of the pull ring 71.

When the snapping portion 720 is located at the position of the opening 10 and partly exposed out of the opening 10, the snapping portion 720 can be snapped with a concave portion on the inner wall surface of the mating connector, In order to realize the lock statement between the optical electrical connector 100 and the mating connector. When the snapping portion 720 is disengaged away from the opening 10 under the pulling force of the pull ring 71, the snapping portion 720 is also disengaged away from the concave portion on the inner wall surface of the mating connector, in order to realize the unlock statement between the optical electrical connector 100 and the mating connector.

Referring to FIGS. 2, 4, 8, and 9, the lock structure 7 includes a spring member 73. The pull strap 72 includes a resisting portion 721 abutting against one end of the spring member 73. The casing 1 includes a resisting wall 104 abutting against the other end of the spring member 73. The spring member 73 provides a restoring force to the pull strap 72, so that the snapping portion 720 can be reset to be accommodated in the opening 10 again when the pulling force of the pull strap 72 disappears. That is, the spring member 73 ensures the repeated locking-unlocking function between the optical electrical connector 100 and the mating connector.

Referring to FIGS. 2 and 4, in a preferred embodiment, the number of the spring members 73 is two. The two spring members 73 are arranged side by side along a third direction (i.e., the left-right direction in FIG. 1) that is perpendicular to both the first direction and the second direction. Correspondingly, the number of the resisting portions 721 and the number of the resisting walls 104 are both two. Therefore, the two spring members 73 can provide the required restoring force to the lock structure 7 in a left-right balance.

Referring to FIGS. 1 to 11, the optical electrical connector 100 is used for plugging with the cable 200. The optical electrical connector 100 includes an insulating body 8 and a conductive terminal 9. The optical port 102 is formed at the end of the insulating body 8 facing the cable 200. That is, the cable 200 is inserted into the optical port 102 and transmits an optical signal to the printed circuit board 3 through the conductive terminal 9. The printed circuit board 3 controls the photoelectric conversion component 5 through the electronic chip 4 to convert the received optical signal into an electrical signal, which is then transmitted from the gold finger exposed in the electrical port 101. The number of the electronic chips 4, the number of the photoelectric conversion components 5 and the number of the conductive terminals 9 are all two. The cable 200 includes two wire cores (not shown) corresponding to the conductive terminals 9 one-to-one. The optical electrical connector 100 can not only convert optical signals into electrical signals, but also enable the golden fingers in the electrical port 101 to receive the electrical signals transmitted by the mating connector when the optical electrical connector 100 is mated with the mating connector. The printed circuit board 3 controls the photoelectric conversion component 5 through the electronic chip 4 to convert the received electrical signal into an optical signal, which is then transmitted to the cable 200 through the conductive terminal 9. Therefore, the photoelectric conversion component 5 may be an electronic component with dual conversion functions of converting optical signals into electrical signals (optical->electrical) and converting electrical signals into optical signals (electrical->optical). One of the photoelectric conversion components 5 is responsible for converting optical signals into electrical signals and the other one of the photoelectric conversion components 5 is responsible for converting electrical signals into optical signals. The optical-electrical conversion principle and the optical-electrical conversion principle are techniques well known to those skilled in the art, and will not be described in detail in the present disclosure.

In the optical electrical connector 100 of the present disclosure, the heat sink device 2 for heat dissipation is disposed on the casing 1. The heat sink device 2 is disposed facing the electronic chip 4 and the heat sink device 2 can conduct the heat on the electronic chip 4 to the outside through the casing 1. The optical electrical connector 100 of the present disclosure has a more efficient and stable heat dissipation structure.

The above embodiments are only used to illustrate the present disclosure and not to limit the technical solutions described in the present disclosure. The understanding of this specification should be based on those skilled in the art. Descriptions of directions, such as "front", "back", "left", "right", "top" and "bottom", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An optical electrical connector, comprising:
    a casing comprising an electrical port and an optical port, the electrical port having a plurality of gold fingers, the optical port being disposed opposite to the electrical port along a first direction, a receiving space being defined by the casing between the electrical port and the optical port;
    a printed circuit board extending longitudinally along the first direction, the printed circuit board comprising a main body portion located in the receiving space and a front end portion exposed in the electrical port;
    at least one electronic chip and at least one photoelectric conversion component being accommodated in the receiving space, the electronic chip and the photoelectric conversion component not only being disposed on the printed circuit board but also electrically connected to the printed circuit board;
    a heat sink device being accommodated in the receiving space, the heat sink device being disposed on the casing and facing the electronic chip for conducting the heat accumulated on the electronic chip to the outside of the optical electrical connector through the casing; and
    at least one electromagnetic wave absorbing element, wherein the casing comprises a first casing and a second casing, the first casing and the second casing are fastened together in a second direction perpendicular to the first direction, the receiving space is formed by the first casing and the second casing; wherein the first casing comprises a first extension portion protruding toward the second casing, the second casing comprises a second extension portion protruding toward the first casing, the first extension portion and the second extension portion are aligned in the second direction for adhering the electromagnetic wave absorbing element.

2. The optical electrical connector according to claim 1, wherein the heat sink device is made of metal material to be a metal heat sink device.

3. The optical electrical connector according to claim 2, wherein the heat sink device is made of alloy.

4. The optical electrical connector according to claim 2, wherein the casing is a metal casing adapted for fixing to the metal heat sink device by welding.

5. The optical electrical connector according to claim 2, wherein the casing is a plastic casing adapted for integrating with the metal heat sink device by insert molding.

6. The optical electrical connector according to claim 1, wherein the number of the electromagnetic wave absorbing elements is two, one of the electromagnetic wave absorbing elements is disposed between the first extension portion and the printed circuit board, and a remaining one of the electromagnetic wave absorbing elements is disposed between the second extension portion and the printed circuit board.

7. The optical electrical connector according to claim 1, wherein the gold fingers are located on a first side of the at least one electromagnetic wave absorbing element in the first direction, while the heat sink device, the electronic chip and the photoelectric conversion component are all located on a second opposite side of the at least one electromagnetic wave absorbing element in the first direction.

8. The optical electrical connector according to claim 1, further comprising a plurality of thermal conductive pads sandwiched between the printed circuit board and the second casing.

9. The optical electrical connector according to claim 8, further comprising thermal conductive colloid filled between the heat sink device and the electronic chip.

10. The optical electrical connector according to claim 1, further comprising a lock structure, wherein the lock structure comprises a pull ring exposed outside of the casing and a pull strap connected with the pull ring, the pull strap comprises a snapping portion, the casing includes an opening, the snapping portion is not only exposed out of the opening for being locked with a mating connector but also is detachable away from the opening under the pulling force of the pull ring for being unlocked with the mating connector.

11. The optical electrical connector according to claim 10, further comprising a spring member providing a restoring force to ensure that the snapping portion can be reset to be accommodated in the opening, wherein the pull strap includes a resisting portion abutting against one end of the spring member and the casing includes a resisting wall abutting against the other end of the spring member.

12. An optical electrical connector, comprising:
a printed circuit board extending longitudinally along a first direction;
a heat sink device;
an electronic chip;
a photoelectric conversion component; and
a casing comprising a receiving space accommodating all of the heat sink device, the electronic chip and the photoelectric conversion component;
wherein both the electronic chip and the photoelectric conversion component are not only disposed on the printed circuit board, but also electrically connected to the printed circuit board, the heat sink device is disposed on the casing and faces the electronic chip in a second direction perpendicular to the first direction, the heat sink device is adapted to absorb the heat accumulated on the electronic chip and disperse the heat to the outside of the optical electrical connector via the casing; and
wherein the optical electrical connector further comprises at least one electromagnetic wave absorbing element, wherein the casing comprises a first casing and a second casing, the first casing and the second casing are fastened together in a second direction perpendicular to the first direction, the receiving space is formed by the first casing and the second casing; wherein the first casing comprises a first extension portion protruding toward the second casing, the second casing comprises a second extension portion protruding toward the first casing, the first extension portion and the second extension portion are aligned in the second direction for adhering the electromagnetic wave absorbing element.

13. The optical electrical connector according to claim 12, wherein the heat sink device is made of metal material to be a metal heat sink device.

14. The optical electrical connector according to claim 13, wherein the heat sink device is made of alloy.

15. The optical electrical connector according to claim 13, wherein the casing is a metal casing adapted for fixing to the metal heat sink device by welding.

16. The optical electrical connector according to claim 13, wherein the casing is a plastic casing adapted for integrating with the metal heat sink device by insert molding.

17. The optical electrical connector according to claim 12, further comprising a plurality of thermal conductive pads, wherein the casing comprises a first casing and a second casing fastened to the first casing in the second direction, the printed circuit board includes a first surface facing the first casing and a second surface facing the second casing, the thermal conductive pads are sandwiched between the second surface of the printed circuit board and the second casing.

18. The optical electrical connector according to claim 17, further comprising thermal conductive colloid, the electronic chip is mounted on the first surface of the printed circuit board, the heat sink device is disposed on the first casing and faces the electronic chip, and the thermal conductive colloid is filled between the heat sink device and the electronic chip.

* * * * *